(12) United States Patent
Robinson et al.

(10) Patent No.: US 11,871,198 B1
(45) Date of Patent: Jan. 9, 2024

(54) SOCIAL NETWORK BASED VOICE ENHANCEMENT SYSTEM

(71) Applicant: Meta Platforms Technologies, LLC, Menlo Park, CA (US)

(72) Inventors: Philip Robinson, Seattle, WA (US); Vladimir Tourbabin, Sammamish, WA (US); Jacob Ryan Donley, Kirkland, WA (US); Andrew Lovitt, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 371 days.

(21) Appl. No.: 16/508,648

(22) Filed: Jul. 11, 2019

(51) Int. Cl.
| | | |
|---|---|---|
| *G06V 40/16* | (2022.01) | |
| *G10L 17/00* | (2013.01) | |
| *H04R 5/04* | (2006.01) | |
| *H04R 5/033* | (2006.01) | |
| *H04R 3/04* | (2006.01) | |
| *G06F 3/01* | (2006.01) | |
| *G10L 25/54* | (2013.01) | |
| *G10L 21/0208* | (2013.01) | |

(52) U.S. Cl.
CPC ............ *H04R 5/04* (2013.01); *G06F 3/013* (2013.01); *G06V 40/172* (2022.01); *G10L 17/00* (2013.01); *G10L 21/0208* (2013.01); *G10L 25/54* (2013.01); *H04R 3/04* (2013.01); *H04R 5/033* (2013.01)

(58) Field of Classification Search
CPC ..... H04R 1/1083; H04R 5/04; G10L 21/0208; G10L 15/20; G10L 21/02; G06F 3/013; G06K 9/00295
See application file for complete search history.

(56) References Cited

U.S. PATENT DOCUMENTS

| | | | |
|---|---|---|---|
| 10,206,055 B1 | 2/2019 | Mindlin et al. | |
| 10,217,286 B1* | 2/2019 | Angel | G06V 20/59 |
| 10,755,463 B1 | 8/2020 | Albuz et al. | |
| 2012/0093320 A1 | 4/2012 | Flaks et al. | |
| 2016/0125876 A1* | 5/2016 | Schroeter | G10L 21/028 |
| | | | 704/226 |
| 2017/0039750 A1 | 2/2017 | Tong et al. | |
| 2017/0280235 A1 | 9/2017 | Varerkar et al. | |
| 2017/0366896 A1 | 12/2017 | Adsumilli et al. | |

(Continued)

FOREIGN PATENT DOCUMENTS

WO 2020079485 A2 4/2020

OTHER PUBLICATIONS

Non-Final Office Action dated Sep. 29, 2021 for U.S. Appl. No. 16/869,925, filed May 8, 2020, 14 pages.

(Continued)

*Primary Examiner* — Thomas H Maung
(74) *Attorney, Agent, or Firm* — Fenwick & West LLP

(57) ABSTRACT

An audio system presents enhanced audio content to a user of a headset. The audio system detects sounds from the local area, at least a portion of which originate from a human sound source. The audio system obtains a voice profile of an identifies human sound source that generates at least the portion of the detected sounds. Based in part on the voice profile, the audio system enhances the portion of the detected sounds that are generated by the human sound source to obtain enhanced audio. The audio system presents the enhanced audio to the user.

17 Claims, 7 Drawing Sheets

(56) References Cited

U.S. PATENT DOCUMENTS

| | | |
|---|---|---|
| 2018/0262849 A1 | 9/2018 | Farmani et al. |
| 2018/0277133 A1 | 9/2018 | Deetz et al. |
| 2018/0302738 A1 | 10/2018 | Di Censo et al. |
| 2019/0116448 A1 | 4/2019 | Schmidt et al. |
| 2020/0174734 A1* | 6/2020 | Gomes .................... G06F 3/165 |
| 2020/0265860 A1* | 8/2020 | Mouncer ................. H04R 5/04 |
| 2020/0292817 A1 | 9/2020 | Jones et al. |
| 2020/0296521 A1* | 9/2020 | Wexler .................... H04N 5/38 |

OTHER PUBLICATIONS

Non-Final Office Action dated Nov. 8, 2022 for U.S. Appl. No. 17/591,181, filed Feb. 2, 2022, 8 pages.

* cited by examiner

SOCIAL NETWORK BASED VOICE ENHANCEMENT SYSTEM

BACKGROUND

The present disclosure relates generally to presentation of audio at a headset, and specifically relates to a social network based voice enhancement system.

A user may be in a noisy environment with a plurality of sound sources. In such a case, the user may have difficulty hearing a sound source, such as a person's voice. It is desirable to isolate and enhance the sound source, such that the user perceives improved speech with intelligibility, clarity, and/or loudness. Conventional voice enhancement systems use statistical properties of speech, but fail to account for variances in vocal properties. For example, an individual's vocal properties may differ at different times during the day, while also differing from the vocal properties of people around them.

SUMMARY

Embodiments of the present disclosure support an audio system, a method, and a computer readable medium for providing social network based voice enhancement. The audio system includes at least one array of acoustic sensors (each array of acoustic sensors including at least one acoustic sensor) configured to detect sounds within a local area. The audio system further includes a controller configured to determine sounds originating from a human sound source in the local area based in part on the detected sounds, which is then used to identify the human sound source. The controller may further retrieve or otherwise obtain a voice profile of the identified human sound source. The controller may enhance the sounds originating from the human sound source based in part on the voice profile. The controller may present the enhanced audio content to a user wearing a headset that includes the audio system.

Figure 1A:
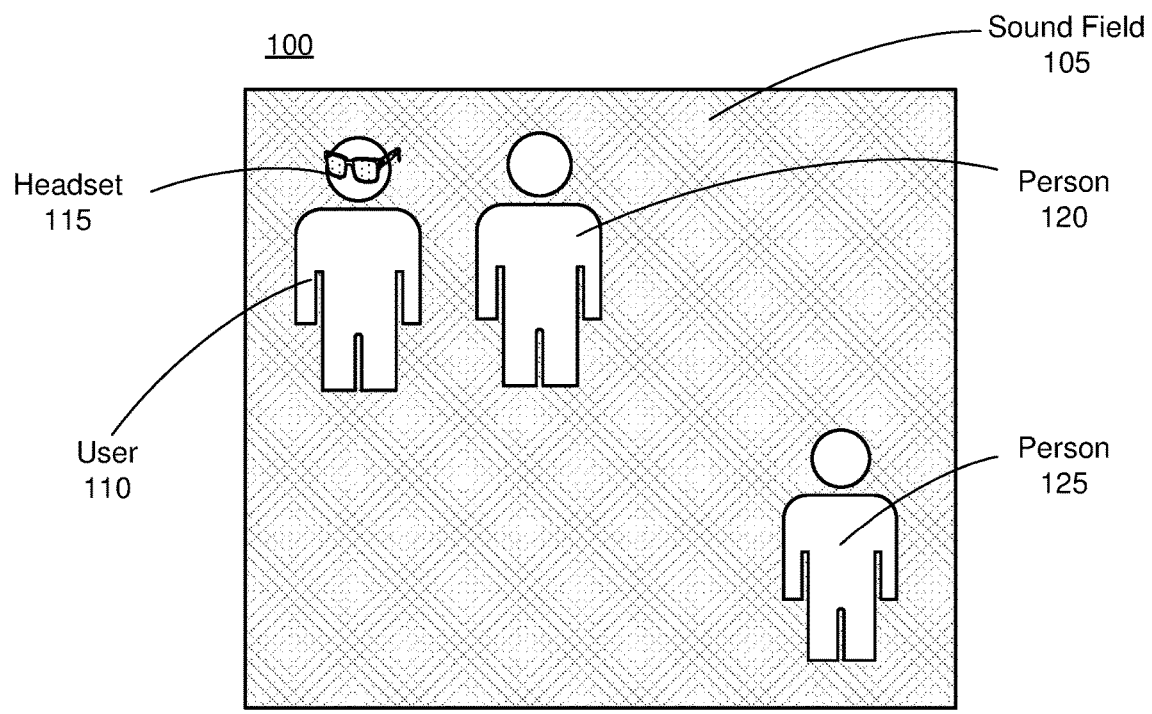
FIG. 1A illustrates a sound field captured by an audio system, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

An audio system presented herein provides enhanced audio content to a user via an artificial reality headset. The audio system may be integrated as part of the headset. The audio system may be coupled via a network to a social networking system (e.g., server) that stores voice profiles of various persons. Alternatively, the voice profiles may be stored in a local memory of the audio system. The user may be in a local area with multiple sound sources, at least one of which is a human sound source (i.e., another person speaking, singing, humming, etc.). In a noisy local area with multiple sound sources, the user may have difficulty hearing voice signals that correspond to the human sound source. The audio system presented herein is configured to enhance the voice signals corresponding to the human sound source.

The audio system detects, via an array of acoustic sensors, a portion of sounds in the local area that originate from the human sound source, i.e., the speaker, e.g., by filtering the sounds captured in the local area thereby detecting voice signals from the speaker. The audio system identifies the human sound source that generates the portion of the sounds and retrieves or obtains a corresponding voice profile, e.g., from a local memory of the audio system or a social networking system at the server. Based on the voice profile, the audio system subsequently enhances the detected voice signals from the speaker and presents the enhanced audio to the user of the headset.

Prior to detecting the voice signal coming from the speaker within the noisy local area, the audio system may facilitate creating a voice profile of the speaker. For example, an array of acoustic sensors of the audio system may record a first voice signal of the speaker in a quiet environment. A controller of the audio system may subsequently generate a first voice profile of the speaker, the voice profile including properties such as one or more spectro-temporal patterns, at least one fundamental frequency, information about a harmonic structure, and at least one fundamental frequency of the first voice signal. Recording of the first voice signal may be used in conjunction with machine learning techniques (e.g., neural networks and Gaussian mixture models) to encode unique latent parameters of the speaker's voice. The audio system may further determine one or more additional voice profiles based on additional voice signals that are recorded in one or more different environments. For example, the audio system may record a voice signal of the speaker in a noisy environment (e.g., on a busy street) and then determine a second voice profile, which accounts for the noise in the background. The first and second voice profiles may be stored at a server that is part a social networking system. Alternatively, the first and second voice profiles may be stored in the local memory of the audio system or headset. In some embodiments, multiple acoustic profiles obtained in various environments with different levels of noise are combined into a single voice profile and stored at, e.g., the server or at the local memory of the headset.

The headset that integrates the audio system and presents the enhanced voice to the user may be, e.g., a NED, HMD, or some other type of headset. The headset may be part of an artificial reality system and may further include an eye tracker and/or an imaging device. The eye tracker is configured to track the position of the eye and direction of sight of the user of the headset. The direction of user's sight may be used in determining a human sound source whose voice signal would be enhanced. The imaging device is configured to capture image data that could be used for facial recognition of a person speaking to the user. For example, the image data may include one or more facial features (e.g., separation between eye pupils), one or more facial expressions and/or one or more gestures of a person speaking to the user. The controller of the audio system may identify a voice profile of the person speaking to the user by applying facial recognition. Based on the captured image data, the controller of the audio system may identify a social network profile for the person speaking to the user and retrieve the voice profile from the identified social network profile. In some embodiments, the person would explicitly allow the identification of their social network profile via facial recognition and the subsequent retrieval of their voice profile from their social network profile. Users of the social network who opt out of identification via facial recognition would not be identified on the social network. The image data used for facial recognition may be encrypted on the headset before being sent to the social network to identify the social network profile of the speaker. Alternatively, the image data may be processed on the headset to generate a set of key parameters that match the speaker's profile on the social network. The set of key parameters may be sent to the social network, in place of the facial recognition data.

FIG. 1A illustrates a sound field 105 captured by an audio system, in accordance with one or more embodiments. The sound field 105 includes a number of sound sources within a local area 100. The sound sources may be a user 110 wearing a headset 115, a person 120, and a person 125, among others. The audio system integrated into the headset 115 (not shown in FIG. 1A) detects sounds from the local area 100, filters a portion of the sounds originating from a human sound source (e.g., a person 120) to generate audio content, enhances the audio content, and presents an enhanced version of the audio content to the user 110.

The audio system of the headset 115 may also identify the human sound source (e.g., the person 120) that generates the audio content (e.g., speech signal) to be enhanced. The audio system obtains a voice profile of the person 120 and uses the voice profile to enhance the audio content generated by the person 120. In one embodiment, the voice profile of the person 120 may be stored on a social network profile of the person 120, e.g., in a local memory of the headset 115 or remotely at a server. In another embodiment, a social network profile of the user 110 may include voice profiles of the user 110's connections. For example, the person 120 may be connected to the user 110 on the social networking system, in which case the user 110 may store the person 120's voice profile.

In some embodiments, the audio system comprises an imaging device (e.g., integrated into the headset 115) that captures image data related to the human sound source, e.g., facial features, facial expressions, gestures, etc., that may be used for facial recognition of the human sound source. The audio system may determine that the person 120 is the human sound source based on the captured image data. In one embodiment, social network profiles for the person 120, the person 125 and various other persons are stored in a local memory (e.g., a non-transitory computer readable medium) of the headset 115. In such case, the audio system can retrieve the voice profile directly from the local memory. Responsive to determination of the human sound source, the audio system identifies a social network profile for the human sound source by applying facial recognition using the captured image data. The audio system then retrieves the voice profile from the identified social network profile and enhances the audio content from the person 120 based on the retrieved voice profile. In another embodiment, social network profiles for various persons are stored on a server that is connected (e.g. via a network) with the headset 115 (not shown in FIG. 1A). In such a case, a controller of the server may perform facial recognition using the captured image data from the headset 115 to identify a social network profile for the person 120 and retrieve a voice profile of the person 120. The audio system of the headset 115 may then obtain the retrieved voice profile by communicating with the server and enhance the audio content from the person 120 based on the retrieved voice profile.

In some other embodiments, the audio system extracts a version of a voice profile of the person 120 from a filtered portion of the detected sounds that originate from the person 120. The user 110's headset 115 records the detected sounds from the area surrounding the user 110, including speech from the person 120. The audio system processes the recorded audio content from the local area, e.g., by applying spatial filtering, noise reduction, sound source separation techniques, or some combination thereof to obtain the filtered portion of the speech from the person 120. A voice profile of the person 120 may be then extracted from the filtered portion of the speech from the person 120. The extracted voice profile may include analytically derived parameters, statistically derived parameters and/or maximum-likelihood derived parameters.

If the social network profiles with voice profiles are stored in the local memory of the headset 115, the audio system compares the version of the voice profile with a plurality of voice profiles stored at the local memory of the headset 115. Once the acoustic profile match is found, identity information of the person 120 is determined and his/her voice profile can be retrieved from the local memory of the headset 115. Alternatively, when the social network profiles with voice profiles are stored on the server connected to the headset 115 via a network, the controller of the server searches for the voice profile match, retrieves a voice profile and communicates the retrieved voice profile to the headset 115. The audio system of the headset 115 may then enhance the audio content from the person 120 based on the retrieved voice profile. More details about determining identity information for a human sound source and retrieving a corresponding voice profile are described in conjunction with FIGS. 2A-2B. The audio system of the headset 115 is also described in further detail with respect to FIGS. 2A-2B.

The audio system enhances the detected audio content from the person 120 based on the voice profile of the person 120, and presents the enhanced audio content to the user 110 via the headset 115. Note that the local area 100 is shown as having a rectangular geometry for simplicity. In actuality, the local area 100 would correspond to the environment around the user 110, and the sound field 105 would include a plurality of sound sources other than people. For example, if the user 110 is in a busy café, the sound field 105 may include, in addition to human sound sources, dishes being washed, an espresso machine, and operations of a cash register, etc.

Figure 1B:
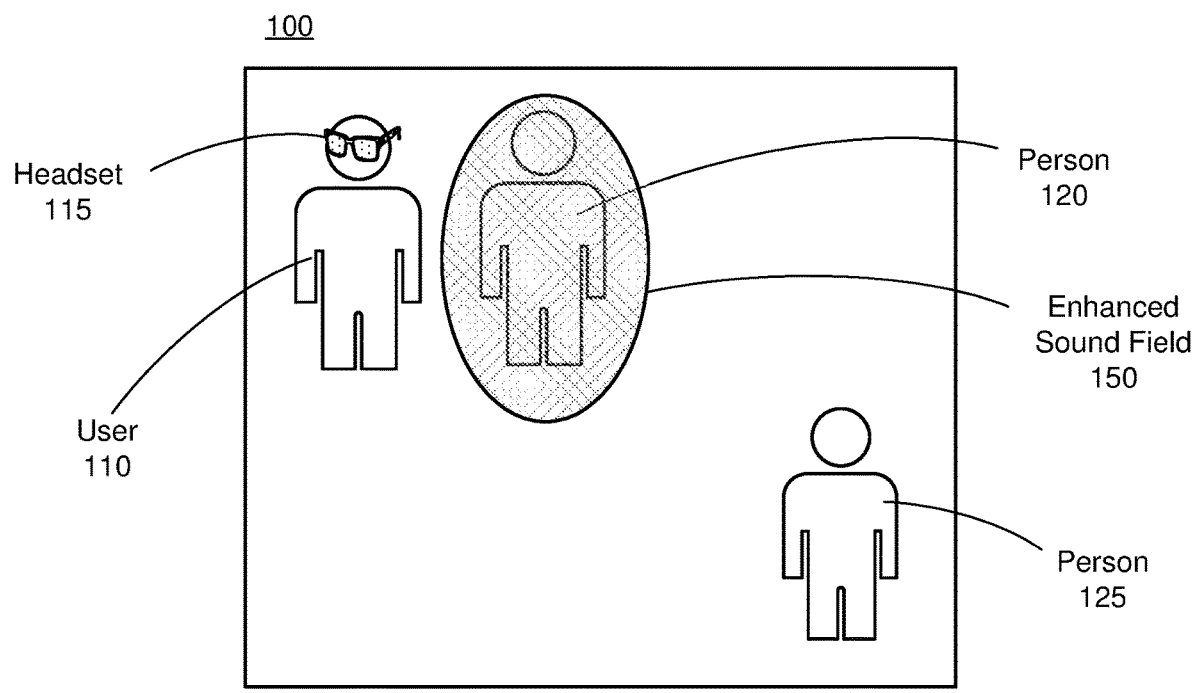
FIG. 1B illustrates a sound field captured by an audio system after voice enhancement, in accordance with one or more embodiments.

FIG. 1B illustrates a sound field 150 captured by an audio system after the voice enhancement, in accordance with one or more embodiments. FIG. 1B shows the same local area 100 as in FIG. 1A but with the enhanced sound field 150 associated with the person 120 who is the identified sound source. The enhanced sound field 150 is formed by the audio system of the headset 115 presenting the enhanced version of the audio content to the user 110, the audio content originating from a human sound source, e.g., the person 120. Note that the human sound source does not have to be adjacent to the user 110. In some embodiments, for example, the headset 115 may present enhanced audio content originating from the person 125 when the person 125 is an identified human sound source in the local area 100. In one embodiment, the user 110 provides the audio system of the headset 115 with input indicating whose voice to enhance. In another embodiment, the audio system determines whose voice to enhance based on sounds detected by audio system. In yet another embodiment, the audio system determines whose voice to enhance based on image data captured by an imaging device coupled to the headset 115 or integrated within the headset 115. For example, the imaging device of the headset 115 detects gestures and/or facial expressions for the person 120, and a controller of the audio system identifies that the person 120 is the one whose voice needs to be enhanced. In yet another embodiment, the audio system determines whose voice to enhance based on a gaze direction of the user 110 determined by an eye tracker of the headset 115, i.e., to determine the human sound source at which the user's gaze is directed towards. The audio system may determine the human sound source based on e.g., a percentage of time the user's gaze is located in region where sound is originating.

Figure 2A:
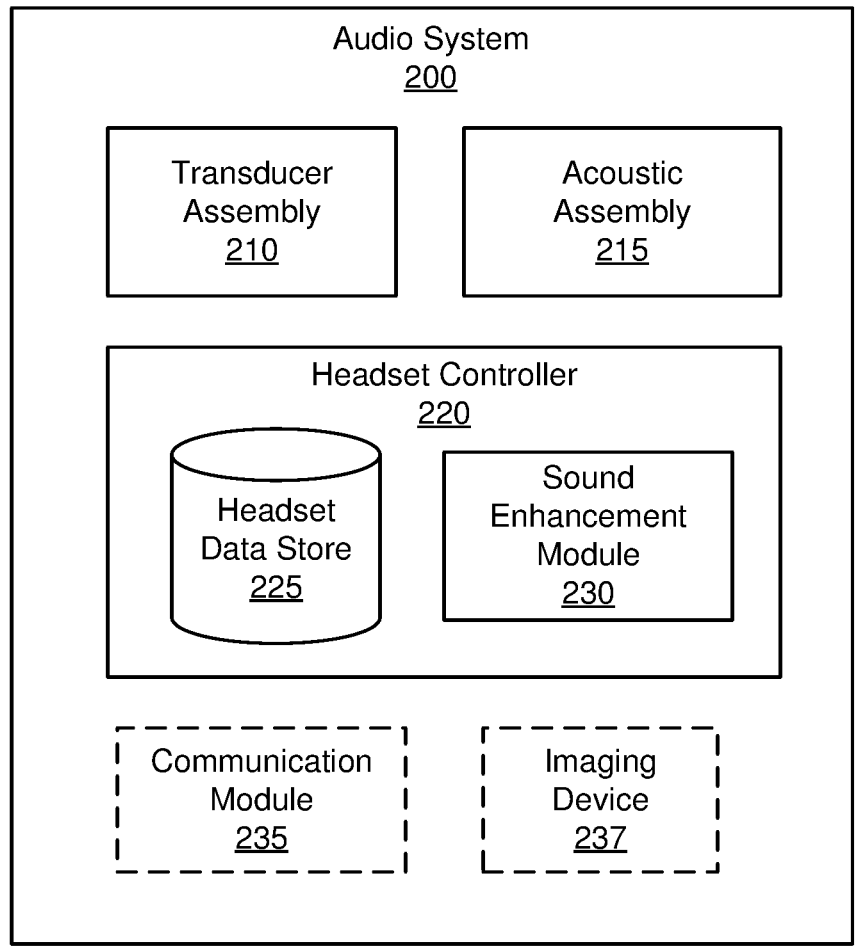
FIG. 2A is a block diagram of an audio system, in accordance with one or more embodiments.

FIG. 2A is a block diagram of an audio system 200, in accordance with one or more embodiments. The audio system 200 provides audio content to a user and may be a component of a headset (e.g., the headset 115). The audio system 200 includes a transducer assembly 210, an acoustic assembly 215, a headset controller 220, an optional communication module 235 and an optional imaging device (camera) 237. Some embodiments of the audio system 200 includes other components than those described herein. Similarly, the functions of components may be distributed differently than described here. For example, in one embodiment, the headset controller 220 may be external to the headset, rather than embedded within the headset.

The transducer assembly 210 produces audio content to the user. The transducer assembly 210 may produce audio content for the user based on instructions from the headset controller 220. The audio content may include enhanced voice content, such as that of the voice of a person in a local area around the user (e.g., the local area 100). The transducer assembly 210 may be implemented as an array of speakers that produce sound by generating acoustic pressure waves, e.g., in accordance with the audio instructions from the headset controller 220. The transducer assembly 210 may be implemented as a piezoelectric transducer, a moving coil transducer, some other transducer, or combination thereof.

In some embodiments, the transducer assembly 210 is implemented as at least a pair of air conduction transducers (e.g., one for each ear) that produce sound by generating an airborne acoustic pressure wave in the user's ears, e.g., in accordance with the audio instructions from the headset controller 220. Each air conduction transducer of the transducer assembly 210 may include one or more transducers to cover different parts of a frequency range. For example, a piezoelectric transducer may be used to cover a first part of a frequency range and a moving coil transducer may be used to cover a second part of a frequency range. In some other embodiments, each transducer of the transducer assembly 210 is implemented as a bone transducer that produces sound by vibrating a corresponding bone in the user's head. Each transducer implemented as a bone conduction transducer may be placed behind an auricle coupled to a portion of the user's bone to vibrate the portion of the user's bone that generates a tissue-borne acoustic pressure wave propagating toward a cochlea of the user, thereby bypassing an eardrum. In some embodiments, each transducer in the transducer assembly 210 may be implemented as a tissue conduction transducer that produces sound by vibrating a corresponding tissue around the user's ear. Each tissue conduction transducer may be coupled to tissue to tissue near the user's ear, such as cartilage, and vibrate the tissue to produce acoustic pressure waves that are transmitted through the tissue and detected by the cochlea.

The acoustic assembly 215 monitors and records sounds in the local area surrounding the user wearing the headset. A portion of the sound detected by the acoustic assembly 215 may originate from at least one human source. For example, in a local area of a public park, the acoustic assembly 215 may detect a number of people speaking, a band playing, cars on a street adjacent to the park, among others. The sounds with human sound sources at the park would include the people speaking, and any vocals performed by the band. The acoustic assembly 215 is also configured to record voice signals that facilitate the generation of a person's voice profile. The acoustic assembly 215 may record a voice signal of a person in an environment having a certain level of noise. For example, the acoustic assembly 215 may record the person reading a passage out loud for one minute in a quiet environment, such as a bedroom. The acoustic assembly 215 may also record another voice signal in another environment having a different level of noise than that at the quiet environment. For example, the acoustic assembly 215 may record the person reading the passage out loud for one minute in a noisy environment, such as on the sidewalk of a busy street. The headset controller 220 uses the recorded voice signals to generate acoustic profiles of the person, i.e., the speaker.

The acoustic assembly 215 may include an array of acoustic sensors, positioned on the headset, configured to detect acoustic pressure waves. An array of acoustic sensors includes at least one acoustic sensor. For example, the acoustic sensors may be microphones, vibration sensors, accelerometers, or any combination thereof. The acoustic assembly 215 provides the audio content detected, including the detected sounds from the local area and the recorded voice signals, to the headset controller 220. The acoustic assembly 215 may perform positional tracking of a source of the detected sounds within the local area by direction of arrival (DOA) analysis, video tracking, computer vision, or any combination thereof. The acoustic assembly 215 may use beamforming techniques to detect the source of the audio content. In some embodiments, the headset includes sensors other than those for detecting acoustic pressure waves. For example, the headset may include image sensors, initial measurement units (IMUs), gyroscopes, position sensors, or a combination thereof. The image sensors may be cameras configured to perform the video tracking and/or communicate with the headset controller 220 for computer vision. Beamforming and DOA analysis are further described in detail in U.S. patent application Ser. No. 16/379,450 filed on Apr. 9, 2019 and Ser. No. 16/016,156 filed on Jun. 22, 2018, incorporated herein by reference in their entirety.

The headset controller 220 provides audio instructions to the transducer assembly 210 for generating sound for presentation to a user of the headset. The generated sound may include an enhanced version of a voice signal that corresponds to a human sound source. The headset controller 220 may further present video content to the user, e.g., on a display of the headset, as further described in FIGS. 4-5. The headset controller 220 includes a headset data store 225 and a sound enhancement module 230.

The headset controller 220 receives, from the acoustic assembly 215, recorded voice signals from a person speaking and is configured to generate one or more acoustic profiles for the speaker. The headset controller 220 receives a speaker's voice signal, recorded in an environment having a certain noise level. As discussed above, the voice signal may be recorded via the acoustic assembly 215. The headset controller 220 determines an acoustic profile based on the recorded voice signal, wherein the acoustic profile characterizes the voice of the speaker. The acoustic profile may indicate a number of acoustic properties and/or features of the speaker's voice, such as spectral profiling, a fundamental frequency of voice, coefficients of a mel-frequency cepstrum (MFCCs) that approximate how the auditory systems of other people respond to the person speaking, other acoustic properties, or a combination thereof. The acoustic profile may be associated with a specific noise level in an environment. Accordingly, the headset controller 220 determines an acoustic profile for each environment in which a voice signal was recorded. For example, the speaker may have recorded a second voice signal in a second environment with a second noise level. In some embodiments, the second noise level may be higher than the noise level in the first environment. The acoustic profile as per the second voice signal determined by the headset controller 220 may vary due to the environments' differing noise levels. The headset controller 220 may store the one or more acoustic profiles in the headset data store 225. Alternatively, or additionally, the headset controller 220 provides, via a network, the one or more acoustic profiles to a social networking system (i.e., a server), which is described in further detail with respect to FIG. 2B. Alternatively, the headset controller 220 may combine a plurality of acoustic profiles into a single voice profile, which may be stored in the headset data store 225 and/or provided to the social networking system.

The headset controller 220 also receives, from the acoustic assembly 215, detected sounds from the local area around the user. In some embodiments, the headset controller 220 filters the detected sounds to determine the portion of the detected sounds that originate from a human sound source. The headset controller 220 may classify a sound source as human or non-human by, e.g., analyzing an estimated (array transfer function) ATF generated from the sound source. The headset controller 220 may perform a beamforming operation using the estimated ATF to enhance the detected sounds. The headset controller 220 then input the enhanced sounds into a classifier that performs classification. The use of a classifier to identify a sound source is further described in U.S. patent application Ser. No. 16/221,864.

The headset controller 220 may extract a version of voice profile from the portion of the detected sounds. Various versions of the voice profile may include noise coming from the environment around the human sound source, such as wind noise, background noise, microphone compression, etc. Versions of the voice profile may also account for variations in the human sound source's vocal effort. For example, a voice profile in which the human sound source whispers may be different from those in which they talk and/or scream. The headset controller 220 compares the version of the voice profile to voice profiles stored at, e.g., the headset data store 225. By comparing the version of the voice profile to the stored voice profiles, the headset controller 220 may find a voice profile associated with a similar level of noise as measured in the local area. If the version of the voice profile matches (within a defined threshold) one of the stored voice profiles, the headset controller 220 retrieves that stored voice profile and determines identity information for the human sound source that is associated with the retrieved voice profile. Alternatively, the communication module 235 may communicate information about the extracted version of the voice profile via a network to a server with a social networking system. The information may include the entire voice profile, one or more parameters specific to the profile, such as a fundamental frequency, or some combination thereof. The social networking system may identify the human sound source from the extracted version of the voice profile and retrieve a corresponding voice profile at the server, as discussed in more detail in conjunction with FIG. 2B.

In another embodiment, the headset controller 220 determines identity information for the human sound source based on data captured by the imaging device 237. The imaging device 237 may capture image data associated with people in the local area. Based on the captured image data (e.g., facial features, facial gestures, hand gestures, some other features or gestures, or combination thereof), the headset controller 220 may determine that a specific person is a human sound source. For example, if the user of the headset is at a music festival, an imaging device on the headset may identify a person on stage as a performer, based on the person's gestures, and designate the person as the human sound source. Based on the captured image data and responsive to the determination of the human sound source, the headset controller 220 may also identify a social network profile for the human sound source, e.g., at the headset data store 225 and retrieve the voice profile from the identified social network profile. Alternatively, the communication module 235 may communicate the captured data via a network to a server with a social networking system for identification of a human sound source and retrieval of a corresponding voice profile at the server, as discussed in more detail in conjunction with FIG. 2B.

In another embodiment, the headset controller 220 determines the human sound source via an eye tracker integrated into the headset (not shown in FIG. 2A). The eye tracker may track a gaze direction of an eye of the user of the headset, e.g., when the gaze of the user is directed towards a person in the local area. Accordingly, based on the gaze direction obtained by the eye tracker, the headset controller 220 may determine where the user is looking and at which person in a local area the user's attention is focused on. In the event that the user is speaking with more than one person, the eye tracker may determine a multi-modal distribution of gaze locations, indicating multiple sound sources. Once at least one human sound source is determined, the headset controller 220 can use some of the aforementioned methods to identify the human sound source. Responsive to determination of the human sound source, the headset controller 220 may also filter the detected sounds in the local area surrounding the audio system 200 to determine the portion of the detected sounds originating from the human sound source to be enhanced.

In an environment with multiple sound sources, the headset controller 220 may use beamforming to identify one or more sound sources in the environment. In some embodiments, the headset controller 220 extracts different spatial, temporal, and spectral signatures, e.g., from a time frequency plot (spectrogram). The headset controller 220 may identify spectral components that are continuous in time and harmonics that move parallel over time that are determined to be from a same source. The headset controller 220 distinguishes between the multiple sound sources in the environment and enhances only those that are identified as a human sound source. In some embodiments, the headset controller 220 uses a machine learning classifier to identify a sound source as originating from a human, e.g., by distinguishing various categories of sounds based on spectro-temporal properties of the sounds.

Once the human sound source has been identified, the headset controller 220 retrieves a corresponding voice profile of the human sound source, e.g., from the headset data store 225 or obtains the voice profile retrieved from the server. If the human sound source is a connection of the user on the social networking system and has provided the user with permission to access their voice profile, the headset controller 220 is able to retrieve the human sound source's voice profile. The voice profile may be stored on the human sound source's social network profile, e.g., at the headset data store 225 or at the server. In some embodiments, the user of the headset may store voice profiles of connections on their own social network profile at the headset data store 225 and the headset controller 220 may retrieve voice profiles from the user's social network profile. In some embodiments, a user of the social networking system has the option to make their voice profile public, such that even those who are not connected to them on the social networking system are able to retrieve their voice profile. For example, at a conference, a presenter may allow access to their voice profile publicly such that in a noisy auditorium, the user of the headset is able to enhance audio content originating from the presenter. In some embodiments, upon identifying the human sound source, the headset controller 220 identifies a social network profile of the human sound source and presents at least a portion of the social network profile to the user via the headset. The portion of the presented social network profile may be controlled by permissions associated with the social network profile. For example, profiles may be shared with the human sound source's connections or made public. The sharing permissions may be changed at any time and set for specific durations, such as the duration of the conference, in line with the example above. In some embodiments, the social networking system may identify a number of users located within the same location, such that the human sound source can allow access to their voice profile to the users at the location. For example, the presenter may allow users of the social networking system that are attending the conference to access their voice profile, for the duration of the conference.

The headset data store 225 stores data for use by the audio system 200. Data in the headset data store 225 includes detected sounds from the local area of the user, recorded voice signals, acoustic profiles, voice profiles, at least a portion of the user's social network profile, at least a portion of the user's connections' social network profiles, and other data relevant for use by the audio system 200, or any combination thereof. The detected sounds from the local area may include data collected by the acoustic assembly 215.

The sound enhancement module 230 enhances the portion of the sounds detected from the local area that are associated with the identified human sound source, based on the retrieved voice profile of the human sound source. In some embodiments, the sound enhancement module 230 targets a specific frequency range and uses sound filters to amplify acoustic pressure waves within one or more specific frequency ranges, based on the retrieved voice profile. The sound filters used by the sound enhancement module 230 may include, among others, low pass filters, high pass filters, and bandpass filters. The sound enhancement module 230 may also attenuate sounds from the local area that do not originate from the human sound source, based on the retrieved voice profile. The sound enhancement module 230 provides the transducer assembly 210 with enhanced audio content for presentation to the user of the headset. In some embodiments, the enhanced audio content is stored in the headset data store 225 for later use.

In some embodiments, the audio system 200 includes the communication module 235 that facilitates communication between the server (i.e., the social networking system) and the headset. The communication module 235 may be a transceiver coupled to the headset controller 220. Alternatively, the communication module 235 may be integrated as part of the headset controller 220. The communication module 235 may communicate with the server and the social networking system via a network, as discussed in further detail with respect to FIG. 2B. The communication module 235 may receive, from the social networking system, information about a voice profile of an identified human sound source and/or information at least portion of a social network profile of the identified human sound source. The communication module 235 may also receive the captured image data with facial data from the imaging device 237 and subsequently provide the captured image data to the server to search for a social network profile that matches the captured facial data.

Figure 2B:
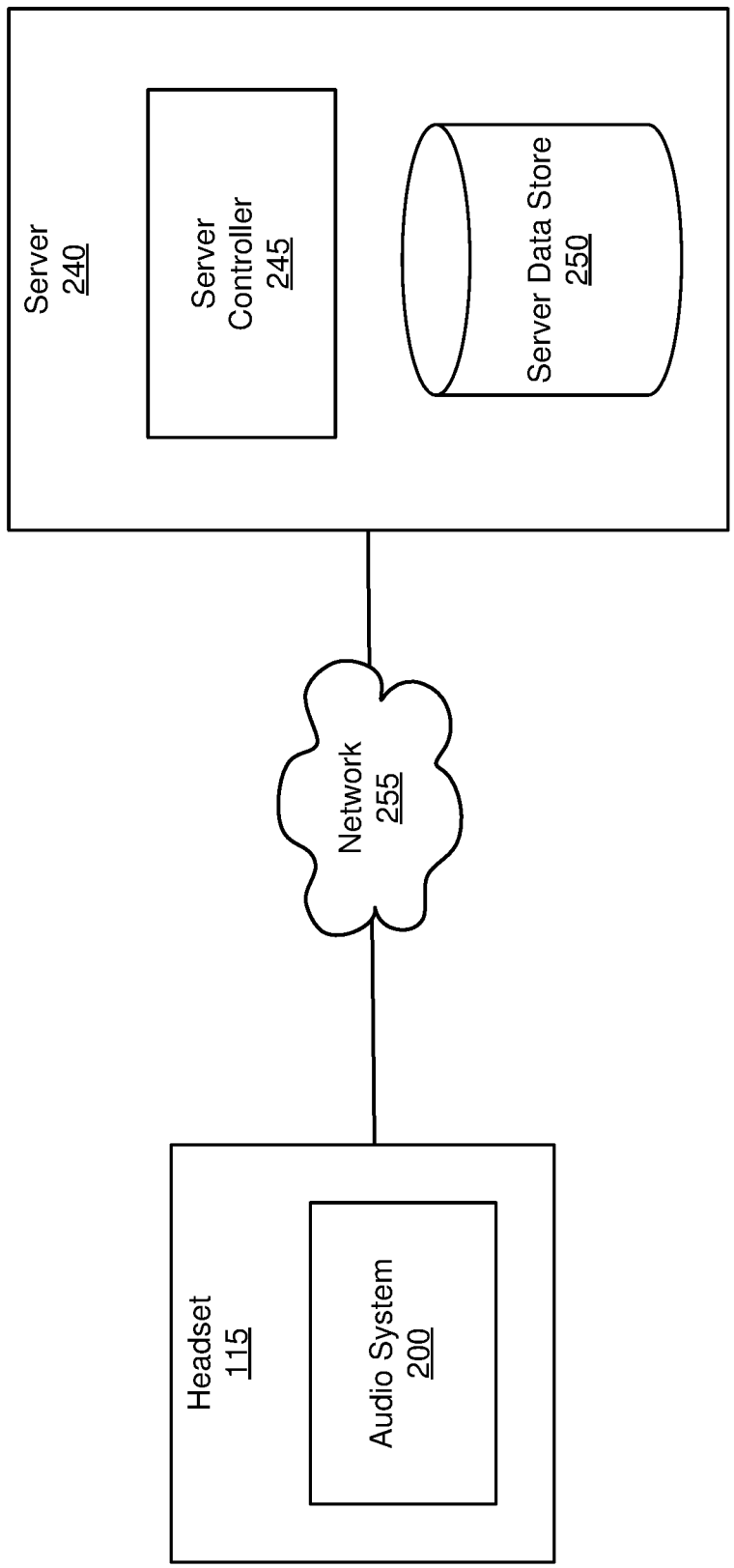
FIG. 2B is a block diagram of a headset with the audio system connected to a server via a network, in accordance with one or more embodiments.

FIG. 2B is a block diagram of the headset 115 with the audio system 200 connected to a server 240 via a network 255, in accordance with one or more embodiments. The headset 115 interfaces with the server 240 via the network 255. The server 240 may host the social networking system and includes a server controller 245 and a server data store 250. The social networking system hosted on the server 240 may facilitate a number of connections between a plurality of users of the social networking system. These connections may be stored in the form of a social graph, in the server data store 250. Each user of the social networking system may have a social network profile, included in which may be one or more voice profiles associated with one or more different environments stored at the server data store 250. In addition, the server 240 may interface with user devices, such as mobile phones and laptops, from which users access the social networking system. Some embodiments of the server 240 include other components than those described herein.

The server controller 245 provides social networking system data to the headset 115 via the network 255. The server controller 245 receives, via the network 255, a request from the headset 115 for identification of a human sound source and retrieval of a corresponding voice profile from the server data store 250. In one embodiment, the server controller 245 receives a version of a voice profile for a detected sound source from the headset, searches through the server data store 250 for a match and retrieves a corresponding voice profile once the match is found. In another embodiment, the server controller 245 receives image data captured by the audio system, performs facial identification on facial data stored in the server data store 250 to identify a human sound source and retrieve a corresponding voice profile. Once the voice profile is retrieved, the server controller 245 may communicate, via the network 255, information about the retrieved voice profile to the audio system 200 for enhancement of voice content associated with the identified human sound source.

The server controller 245 may also determine a voice profile of a user of the headset 115 or any other person whose voice can be recorded by the audio system 200. For example, the user of the headset 115 may choose to record a voice signal on the audio system 200 or some other device (e.g., a mobile phone of the user). The recorded voice signal may be then sent (e.g., via the network 255) to the server controller 245, which then determines a voice profile associated with the environment in which the voice signal was recorded. In another embodiment, the server controller 245 may determine a voice profile of a particular person by analyzing, with that person's permission, interactions on the social networking system. For example, the person may post a video of themselves speaking in an environment, from which the server controller 245 may determine the person's acoustic profile in the environment. Subsequently, the server controller 245 may add the voice profile to the person's social network profile.

The server data store 250 stores data relevant to the server 240. The server data store 250 may include social network profiles of a plurality of persons, social graph information about their connections on the social networking system, voice profiles stored in association with the social network profiles, other data used by the server 240, or some combination thereof. The server data store 250 may also include requests sent by the headset 115 for voice profiles.

The network 255 connects the headset 115 to the sever 240. The network 255 may include any combination of local area and/or wide area networks using both wireless and/or wired communication systems. For example, the network 255 may include the Internet, as well as mobile telephone networks. In one embodiment, the network 255 uses standard communications technologies and/or protocols. Hence, the network 255 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 255 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 255 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 255 may also connect multiple headsets located in the same or different physical locations as compared to the headset 115.

Figure 3:
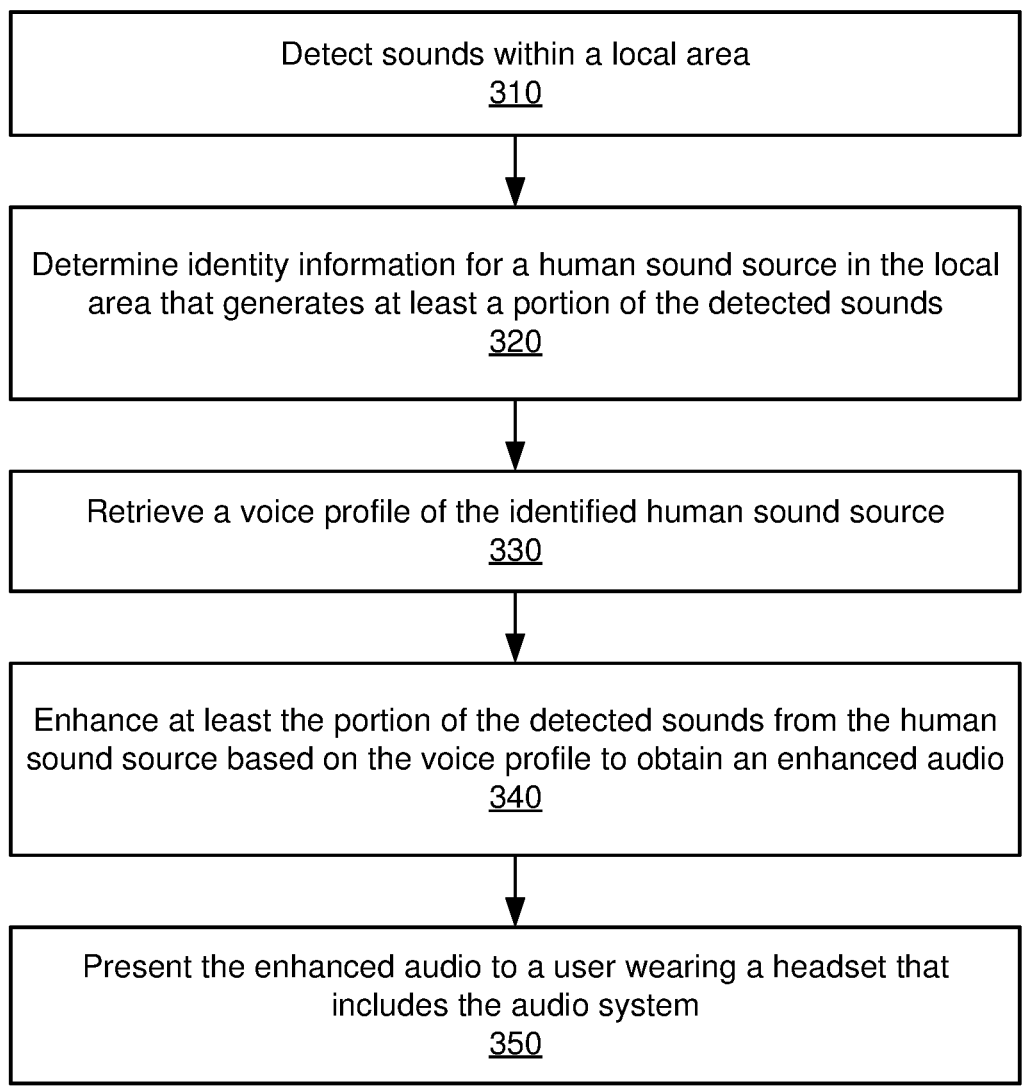
FIG. 3 is a flowchart illustrating a process for voice enhancement, in accordance with one or more embodiments.

FIG. 3 is a flowchart illustrating a process 300 for voice enhancement, in accordance with one or more embodiments. The process 300 of FIG. 3 may be performed by the components of an audio system, such as the audio system 200, in a headset, such as the headset 115. Other entities (e.g., components of the headset 115 of FIGS. 4A-4B and/or components shown in FIG. 5) may perform some or all of the steps of the process in other embodiments. Likewise, embodiments may include different and/or additional steps, or perform the steps in different orders.

The audio system detects 310 (e.g., via an acoustic assembly) sounds within a local area of a user of the headset. The sounds may include a number of sound sources, wherein a portion of the detected sounds originate from human sound sources. The human sound sources may include a number of people speaking in the local area, at least one of whom may be the human sound source the user of the headset would like to enhance.

The audio system determines 320 identity information for a human sound source in the local area that generates at least a portion of the detected sounds. In some embodiments, the audio system filters the detected sounds to determine the portion of the detected sounds that originate from the human sound source. The audio system may determine a version of an acoustic profile from the portion of the detected sounds. The audio system compares the version of the acoustic profile with a plurality of acoustic profiles stored at a local memory (e.g., a non-transitory computer readable medium) of the audio system and determines identity information for the human sound source based on the comparison. The determined identity information may include personally identifiable information (PII) that is subsequently used to identify a social network profile of the human sound source.

In some other embodiments, the audio system captures image data related to the human sound source for facial recognition of the human sound source, e.g., gestures, facial expressions, etc. The audio system determines the human sound source based on the captured image data. For example, if the user is speaking with a person, the person may have large hand gestures and may be angled towards the user, so the audio system is able to determine (e.g., via an imaging device) that the person is in fact the human sound source. Responsive to determination of the human sound source, the audio system may identify a social network profile for the human sound source based on the captured image data. In some other embodiments, the audio system determines a human sound source based on a user's gaze direction. Responsive to determination of the human sound source, the audio system may process the detected sounds to determine the portion of the detected sounds originating from the human sound source, extract a version of a voice profile related to the human sound source and determine identity information for the human sound source by matching the extracted version of the voice profile with a voice profile stored at the local memory of the audio system.

The audio system retrieves 330 a voice profile of the identified human sound source. The person that is the human sound source may be a user of a social networking system, with a social network profile. The social network profile may include the person's voice profile. Once the human sound source is identified as well as his/her social network profile, the audio system retrieves the voice profile from the identified social network profile. The audio system may maintain privacy of a plurality of human sound sources speaking in the local area by retrieving the person's voice profile only if the person is a connection of the user of the headset on the social networking system. The audio system may take into account the noise level in the local area when identifying which voice profile to retrieve. The audio system may retrieve a voice profile of the identified human sound source based on a level of noise measured in the local area.

In some other embodiments, instead at the local memory of the audio system, voice profiles of various persons are stored at a server coupled to the audio system via a network. In such cases, the server identifies a human sound source instead of the audio system and retrieves a corresponding voice profile based on information from the audio system, e.g., an extracted version of a voice profile of a detected sound source or image data related to a detected sound source. The audio system then obtains, via the network, information about the voice profile retrieved at the server.

The audio system enhances 340 at least the portion of the detected sounds from the human sound source based on the voice profile. The portion of the detected sounds originating from the human sound source may be amplified based on the voice profile. Alternatively, all portions of detected sound from the local area except those originating from the human sound source are attenuated based on the voice profile, thereby enhancing the sound originating from the human sound source. In some embodiments, the audio system enhances certain frequencies of the portion of the detected human sounds. In some embodiments, speech sounds from the human sound source may be enhanced while attenuating irrelevant noise at the same time. The enhanced human sound source's speech may be synthesized while preserving spatial cues from the human sound source. The user may perceive the enhanced audio content from the human sound source's position in the local area, rather than as though the human sound source was in some other position in the local area (e.g., closer proximity to the user).

The audio system presents 350 the enhanced audio content to the user of the headset. The user of the headset is able to perceive the human sound source with increased clarity, volume, and intelligibility, as a result of the enhanced audio content. The headset may be traditional headphones, ear buds, in-ear monitors, capable of cartilage conduction and/or bone conduction, or some combination thereof. In some embodiments, the headset may be used with hearing aids and/or a mobile device of the user.

Figure 4A:
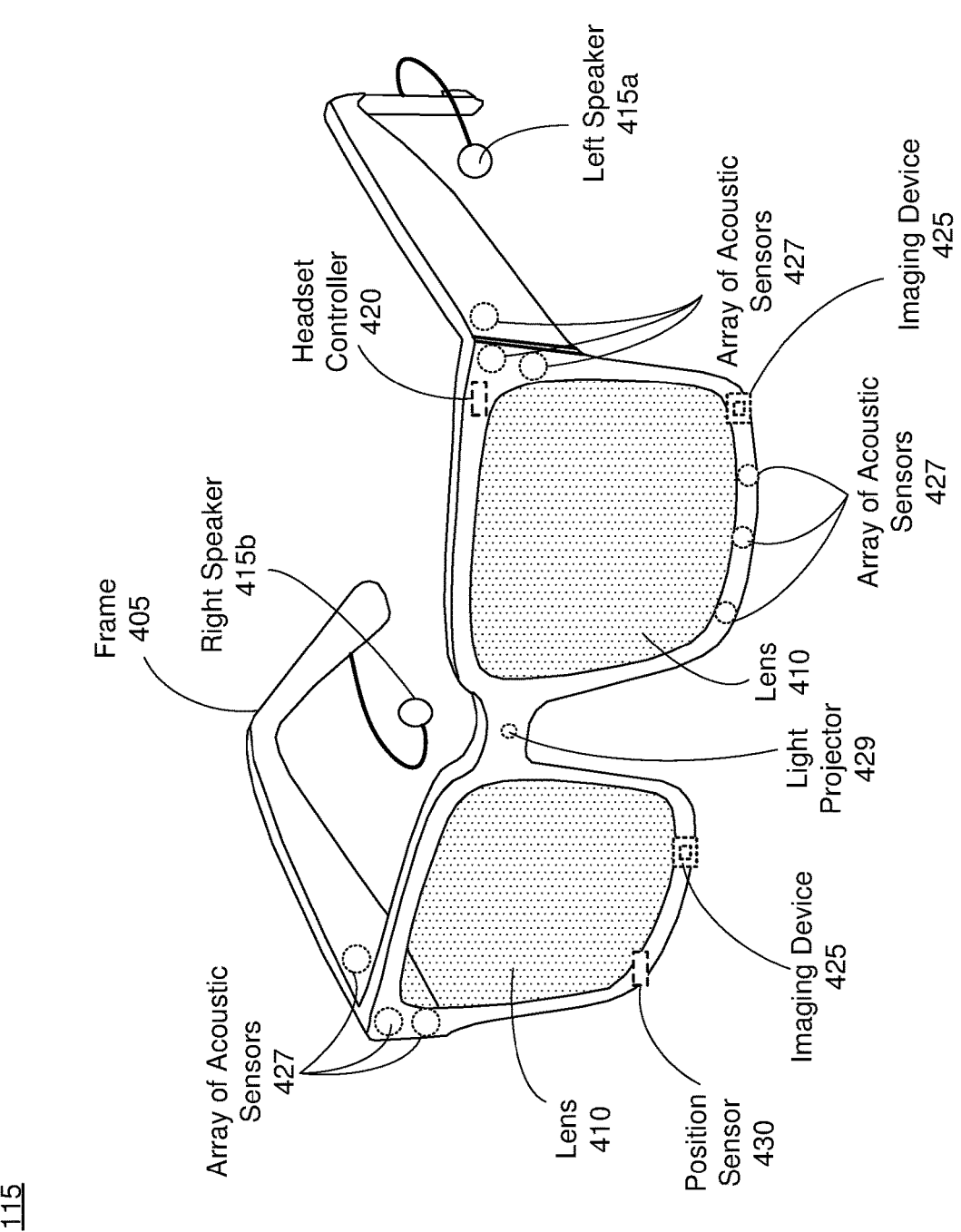
FIG. 4A is a perspective view of a headset implemented as a near-eye display, in accordance with one or more embodiments.

FIG. 4A is a perspective view of the headset 115 implemented as a NED, in accordance with one or more embodiments. In general, the headset 115 may be worn on the face of a user such that content (e.g., media content) is presented using one or both lenses 410 of the headset 115. However, the headset 115 may also be used such that media content is presented to a user in a different manner. Examples of media content presented by the headset 115 include one or more images, video, audio, or some combination thereof. The headset 115 may include, among other components, a frame 405, a lens 410, one or more optional imaging devices 425, an optional light projector 429, a position sensor 430, and an audio assembly. The audio assembly of the headset 115 includes, e.g., a left speaker 415a, a right speaker 415b, a headset controller 420, an array of acoustic sensors 427, one or more other components, or combination thereof. The audio assembly of the headset 115 is an embodiment of the audio system 200 of FIGS. 2A-2B. The headset controller 420 is an embodiment of the headset controller 220. While FIG. 4A illustrates the components of the headset 115 in example locations on the headset 115, the components may be located elsewhere on the headset 115, on a peripheral device paired with the headset 115, or some combination thereof.

The headset 115 may correct or enhance the vision of a user, protect the eye of a user, or provide images to a user. The headset 115 may be eyeglasses which correct for defects in a user's eyesight. The headset 115 may be sunglasses which protect a user's eye from the sun. The headset 115 may be safety glasses which protect a user's eye from impact. The headset 115 may be a night vision device or infrared goggles to enhance a user's vision at night. The headset 115 may be a near-eye display that produces artificial reality content for the user. Alternatively, the headset 115 may not include a lens 410 and may be a frame 405 with an audio assembly that provides audio content (e.g., music, radio, podcasts) to a user.

The frame 405 holds the other components of the headset 115. The frame 405 includes a front part that holds the lens 410 and end pieces to attach to a head of the user. The front part of the frame 405 bridges the top of a nose of the user. The end pieces (e.g., temples) are portions of the frame 405 to which the temples of a user are attached. The length of the end piece may be adjustable (e.g., adjustable temple length) to fit different users. The end piece may also include a portion that curls behind the ear of the user (e.g., temple tip, ear piece).

The lens 410 provides or transmits light to a user wearing the headset 115. The lens 410 may be prescription lens (e.g., single vision, bifocal and trifocal, or progressive) to help correct for defects in a user's eyesight. The prescription lens transmits ambient light to the user wearing the headset 115. The transmitted ambient light may be altered by the prescription lens to correct for defects in the user's eyesight. The lens 410 may be a polarized lens or a tinted lens to protect the user's eyes from the sun. The lens 410 may be one or more waveguides as part of a waveguide display in which image light is coupled through an end or edge of the waveguide to the eye of the user. The lens 410 may include an electronic display for providing image light and may also include an optics block for magnifying image light from the electronic display.

The speakers 415a and 415b produce sound for user's ears. The speakers 415a, 415b are embodiments of transducers of the transducer assembly 210 in FIG. 2A. The speakers 415a and 415b receive audio instructions from the headset controller 420 to generate sounds. The left speaker 415a obtains a left audio channel from the headset controller 420, and the right speaker 415b obtains a right audio channel from the headset controller 420. As illustrated in FIG. 4, each speaker 415a, 415b is coupled to an end piece of the frame 405 and is placed in front of an entrance to the corresponding ear of the user. Although the speakers 415a and 415b are shown exterior to the frame 405, the speakers 415a and 415b may be enclosed in the frame 405. In some embodiments, instead of individual speakers 415a and 415b for each ear, the headset 115 includes a speaker array (not shown in FIG. 4) integrated into, e.g., end pieces of the frame 405 to improve directionality of presented audio content.

In some embodiments, the headset 115 includes a depth camera assembly comprising the one or more imaging devices 425, the light projector 429 and a DCA controller (not shown in FIG. 4A). The one or more imaging devices 425 may capture depth image data describing depth information for a local area surrounding the headset 115. The captured data may be images captured by the one or more imaging devices 425 of light projected onto the local area by the light projector 429. The light projector 429 may emit e.g., structured light and/or flash illumination for time-of-flight. The one or more imaging devices 425 may be used in conjunction with the audio system (e.g., the audio system 200) to determine identity information for a sound source in a local area. For example, the one or more imaging devices 425 may determine identity information for a person in the local area that is a human sound source. The headset 115 may provide the captured image data for the person to a social networking system server in a request for the person's voice profile.

The DCA controller may compute the depth information of the local area using the captured data by applying a depth determination technique. In one embodiment, the depth determination technique is direct/indirect time-of-flight depth sensing. In another embodiment, the depth determination technique is structured light depth sensing. In yet another embodiment, the depth determination technique is stereo depth sensing. In such case, the imaging devices 425 are oriented to capture portions of the local area in stereo. The captured data may be images of the local area captured by multiple cameras of the imaging devices 425 in stereo. In yet another embodiment, the depth determination technique is active stereo depth sensing. In such case, the light projector 429 projects structured light adding texture (features) that facilitate stereo sensing.

Based on the determined depth information, the DCA controller may determine absolute positional information of the headset 115 within the local area. The DCA controller may also generate a model of the local area. The DCA controller may also identify gestures of a person in front of the user of the headset, indicating that the person is a human sound source whose voice the user would like to enhance. The one or more imaging devices 425 may be integrated with the headset 115 or may be positioned within the local area external to the headset 115. In some embodiments, the DCA controller may provide the depth image data to the headset controller 420 of the headset 115, e.g. for determining identity information for the person serving as a human sound source in the local area. The one or more imaging devices 425 may be part of simultaneous localization and mapping (SLAM) sensors mounted the headset 115 for capturing visual information of a local area surrounding some or all of the headset 115.

The array of acoustic sensors 427 monitors and records sound in a local area surrounding some or all of the headset 115, including sound (e.g., speech) generated by the people surrounding the user of the headset 115. The array of acoustic sensors 427 may also be used to record a number of voice signals of a person, from which the headset controller 420 may determine a voice profile. The array of acoustic sensors 427 is an embodiment of the acoustic assembly 215 of FIG. 2A. As illustrated in FIG. 4A, the array of acoustic sensors 427 include multiple acoustic sensors with multiple acoustic detection locations that are positioned on the headset 115. The array of acoustic sensors 427 may provide the recorded sound as an audio stream to the headset controller 420, e.g., for enhancing the voice audio content.

The position sensor 430 generates one or more measurement signals in response to motion of the headset 115. The position sensor 430 may be located on a portion of the frame 405 of the headset 115. The position sensor 430 may include a position sensor, an inertial measurement unit (IMU), or both. Some embodiments of the headset 115 may or may not include the position sensor 430 or may include more than one position sensors 430. In embodiments in which the position sensor 430 includes an IMU, the IMU generates IMU data based on measurement signals from the position sensor 430. Examples of position sensor 430 include: one or more accelerometers, one or more gyroscopes, one or more magnetometers, another suitable type of sensor that detects motion, a type of sensor used for error correction of the IMU, or some combination thereof. The position sensor 430 may be located external to the IMU, internal to the IMU, or some combination thereof.

Based on the one or more measurement signals, the position sensor 430 estimates a current position of the headset 115 relative to an initial position of the headset 115. The estimated position may include a location of the headset 115 and/or an orientation of the headset 115 or the user's head wearing the headset 115, or some combination thereof. The orientation may correspond to a position of each ear relative to a reference point. In some embodiments, the position sensor 430 uses the depth information and/or the absolute positional information from the imaging device 425 and/or the imaging device 429 to estimate the current position of the headset 115. The position sensor 430 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 115 from the sampled data. For example, the IMU integrates the measurement signals received from the accelerometers over time to estimate a velocity vector and integrates the velocity vector over time to determine an estimated position of a reference point on the headset 115. The reference point is a point that may be used to describe the position of the headset 115. While the reference point may generally be defined as a point in space, however, in practice the reference point is defined as a point within the headset 115.

The headset controller 420 may provide audio instructions to the speakers 415a, 415b for generating sound, e.g., based on enhanced audio content generated by the audio system 200. The headset controller 420 may further present video content to the user, e.g., on the display of the lens 410. The headset controller 420 may be an embodiment of the headset controller 220 of FIG. 2A.

The headset controller 420 may receive, from a social networking system via a network (e.g., the network 225), information about a person's social network profile. The headset controller 420 may be coupled to a communication module (e.g., the communication module 235) that receives and sends information via the network. For example, the communication module may be a transceiver. The headset controller 420 may also provide users' acoustic profiles to the social networking system via the network. The headset controller 420 may be also coupled to a memory (i.e., a non-transitory computer readable medium) that stores voice profiles of various persons (not shown in FIG. 4A). The headset controller 420 may retrieve a voice profile of an identified human sound source from the memory.

Figure 4B:
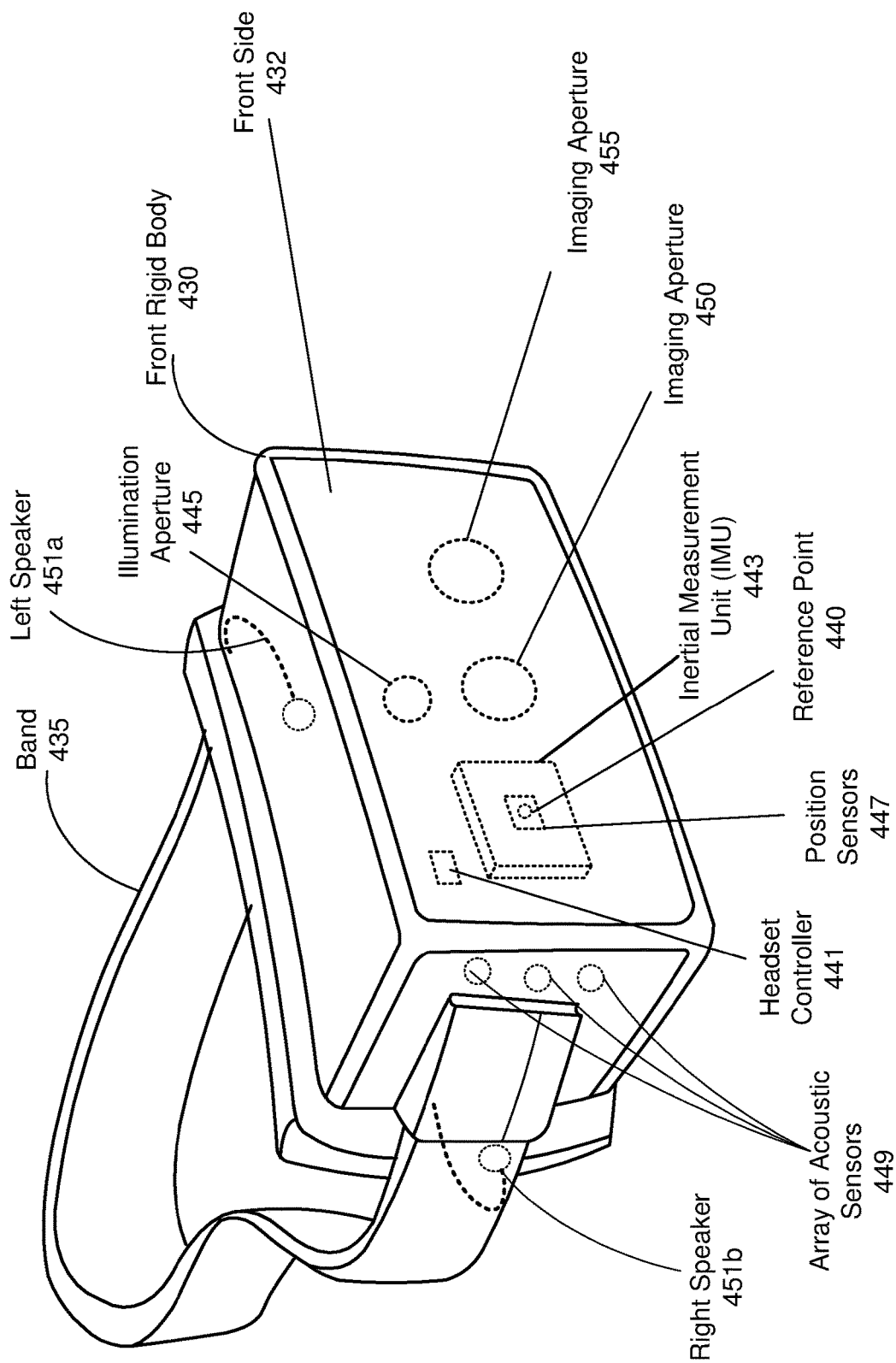
FIG. 4B is a perspective view of a headset implemented as a head-mounted display, in accordance with one or more embodiments.

FIG. 4B is a perspective view of the headset 115 implemented as a HMD, in accordance with one or more embodiments. In embodiments that describe an AR system and/or a MR system, portions of a front side 432 of the HMD are at least partially transparent in the visible band (~380 nm to 750 nm), and portions of the HMD that are between the front side 432 of the HMD and an eye of the user are at least partially transparent (e.g., a partially transparent electronic display). The HMD includes a front rigid body 430, a band 435, and a reference point 440. The HMD may also include a DCA configured to determine depth information of a local area surrounding some or all of the HMD. The HMD may also include an illumination aperture 445 and a pair of imaging apertures 450, 455 associated with the DCA. An illumination source of the DCA emits light (e.g., a structured light pattern) through the illumination aperture 445. At least one imaging device of the DCA captures light that is reflected from the local area through at least one of the imaging apertures 450, 455. The captured light may be images of the local area captured by multiple imaging devices of the DCA in stereo. A controller of the DCA may compute depth information for the local area using the captured light by applying a specific depth determination technique, e.g., direct/indirect time-of-flight depth sensing, structured light depth sensing, passive/active stereo depth sensing, some combination thereof, etc.

The front rigid body 430 may include one or more display elements (not shown in FIG. 4B), one or more integrated eye trackers (not shown in FIG. 4B), an IMU 443, one or more position sensors 447, and the reference point 440. In the embodiment shown by FIG. 4B, the position sensors 447 are located within the IMU 443, and neither the IMU 443 nor the position sensors 447 are visible to a user of the HMD. However, the position sensors 447 may be located external to the IMU 443, internal to the IMU 443, or some combination thereof. The HMD further includes an array of acoustic sensors 449 and speakers 451a, 451b that operate substantially in the same manner as the array of acoustic sensors 427 and the speakers 415a, 415b of FIG. 4A. A headset controller 441 is coupled with various components of the HMD and operates substantially in the same manner as the headset controller 420 of FIG. 4A. In some embodiments, the headset controller 441 is coupled to a memory (not shown in FIG. 4B) that stores voice profiles of various persons. The headset controller 441 may retrieve a voice profile of an identified human sound source from the memory. In some other embodiments, the headset controller 441 is coupled with a communication module (not shown in FIG. 4B) for communication with a server, console or some other device separate from the HMD.

System Environment

Figure 5:
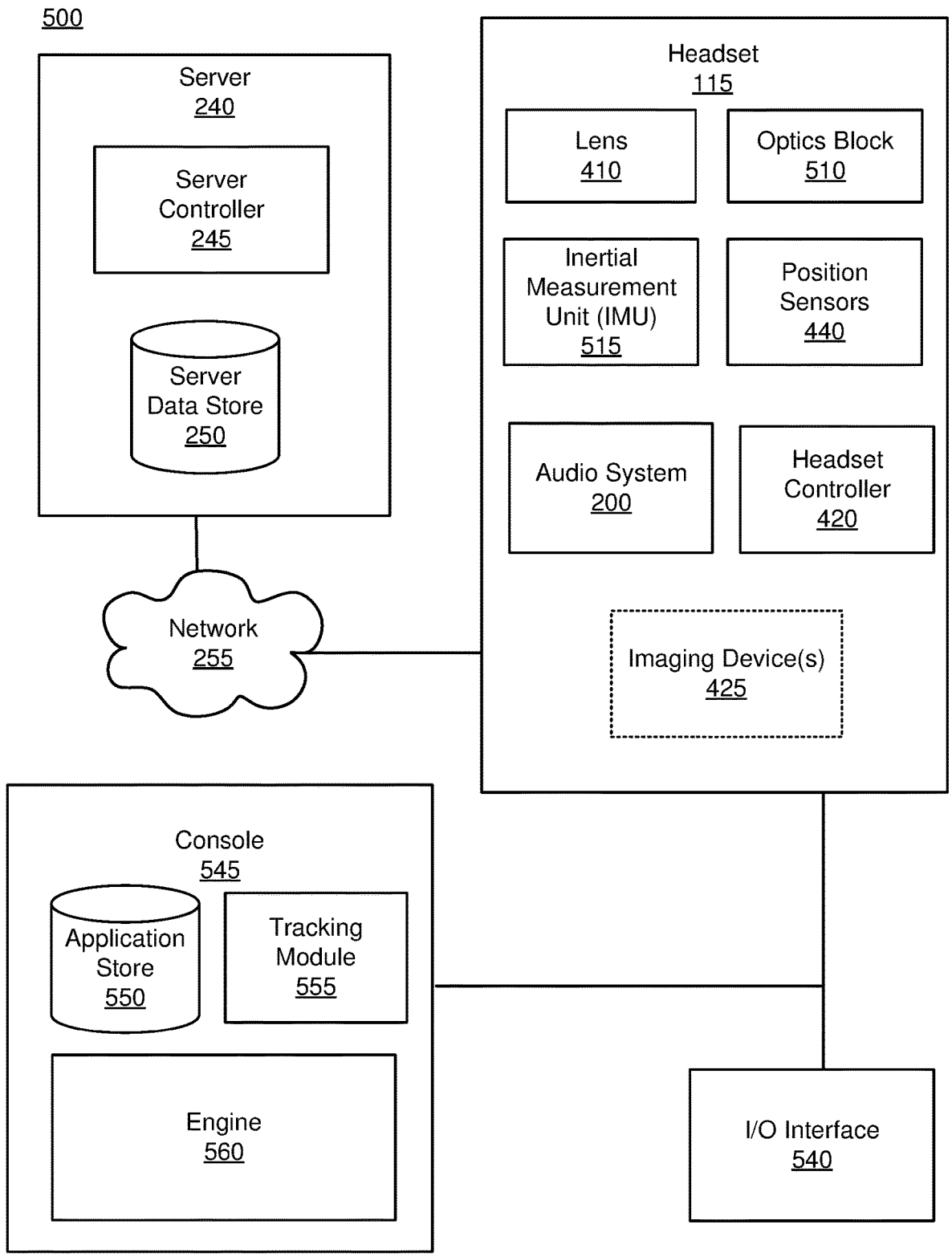
FIG. 5 is a block diagram of a system environment that includes a headset and an audio system, in accordance with one or more embodiments.

FIG. 5 is a block diagram of a system environment that includes a headset and an audio system, in accordance with one or more embodiments. The system 500 may operate in an artificial reality environment, e.g., a virtual reality, an augmented reality, a mixed reality environment, or some combination thereof. The system 500 shown by FIG. 5 includes the headset 115 and an input/output (I/O) interface 540 that is coupled to a console 545. The headset 115 is coupled to the server 240 via the network 255. While FIG. 5 shows an example system 500 including one headset 115 and one I/O interface 540, in other embodiments any number of these components may be included in the system 500. For example, there may be multiple headsets 115 each having an associated I/O interface 540, with each headset 115 and I/O interface 540 communicating with the console 545. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 545 may be provided by the headset 115.

The headset 115 includes the lens 410, an optics block 510, one or more position sensors 440, an inertial measurement unit (IMU) 515, the audio system 200, the headset controller 420, and the one or more imaging devices 425. Some embodiments of headset 115 have different components than those described in conjunction with FIG. 5, e.g., components of the HMD shown in FIG. 4B. Additionally, the functionality provided by various components described in conjunction with FIG. 5 may be differently distributed among the components of the headset 115 in other embodiments, or be captured in separate assemblies remote from the headset 115.

The lens 410 may include an electronic display that displays 2D or 3D images to the user in accordance with data received from the console 545. In various embodiments, the lens 410 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 510 magnifies image light received from the electronic display, corrects optical errors associated with the image light, and presents the corrected image light to a user of the headset 115. In various embodiments, the optics block 510 includes one or more optical elements. Example optical elements included in the optics block 510 include: an aperture, a Fresnel lens, a convex lens, a concave lens, a filter, a reflecting surface, or any other suitable optical element that affects image light. Moreover, the optics block 510 may include combinations of different optical elements. In some embodiments, one or more of the optical elements in the optics block 510 may have one or more coatings, such as partially reflective or anti-reflective coatings.

Magnification and focusing of the image light by the optics block 510 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 510 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 510 corrects the distortion when it receives image light from the electronic display generated based on the content.

The IMU 515 is an electronic device that generates data indicating a position of the headset 115 based on measurement signals received from one or more of the position sensors 440. A position sensor 440 generates one or more measurement signals in response to motion of the headset 115. Examples of position sensors 440 include: one or more accelerometers, one or more gyroscopes, one or more magnetometers, another suitable type of sensor that detects motion, a type of sensor used for error correction of the IMU 515, or some combination thereof. The position sensors 440 may be located external to the IMU 515, internal to the IMU 515, or some combination thereof.

In some embodiments, the headset 115 includes the one or more imaging devices 425. The one or more imaging devices 425 may be part of a DCA that further includes a light projector and a controller (not shown in FIG. 5). The DCA generates depth image data of a local area surrounding some or all of the headset 115. Depth image data includes pixel values defining distance from the imaging device, and thus provides a (e.g., 3D) mapping of locations captured in the depth image data. The light projector may project a structured light pattern or other light that is reflected off objects in the local area, and captured by the one or more imaging devices 425 to generate the depth image data.

For example, the light projector may project a plurality of structured light (SL) elements of different types (e.g. lines, grids, or dots) onto a portion of a local area surrounding the headset 115. In various embodiments, the light projector comprises an emitter and one or more diffractive optical elements. The emitter is configured to illuminate the pattern plate with light (e.g., infrared light). The illuminated pattern plate projects a SL pattern comprising a plurality of SL elements into the local area. For example, each of the SL elements projected by the illuminated pattern plate is a dot associated with a particular location on the pattern plate.

Each SL element projected by the DCA comprises light in the infrared light part of the electromagnetic spectrum. In some embodiments, the illumination source is a laser configured to illuminate one or more diffractive optical elements with infrared light such that it is invisible to a human. In some embodiments, the illumination source may be pulsed. In some embodiments, the illumination source may be visible and pulsed such that the light is not visible to the eye.

The SL pattern projected into the local area by the DCA deforms as it encounters various surfaces and objects in the local area. The one or more imaging devices 425 are configured to capture one or more images of the local area. Each of the one or more images captured may include a plurality of SL elements (e.g., dots) projected by the light projector and reflected by the objects in the local area. Each of the one or more imaging devices 425 may be a detector array, a camera, or a video camera.

In some embodiments, the DCA integrating the one or more imaging devices 425 generates depth image data using the time-of-flight depth sensing technique. The DCA may generate the depth image data based on time required to light to be emitted from the light projector until at least a portion of the light reflected from one or more objects in the local area is captured by the one or more imaging devices 425. In some other embodiments, the DCA generate depth image data using active or passive stereo imaging based on image data captured by the one or more imaging devices 425. By comparing information about a local area from two vantage points, the DCA may extract depth information based on relative positions of objects in two panels.

The controller of the DCA generates the depth image data based on light captured by the one or more imaging devices 425. The controller may further provide the depth image data to the console 545, the headset controller 420, or some other component.

The audio system 200 enhances audio content and presents enhanced audio content to the user of the headset 115. The audio assembly 200 detects sounds in a local area around the user of the headset, of which at least a portion is from a human sound source. The audio system may determine identity information for the human sound source and corresponding portions of the sounds from the local area. The audio assembly 200 may retrieve a voice profile of the identified human sound source. In some embodiments, the audio system 200 communicates with the server 240 that stores a plurality of voice profiles at the server data store 250. The audio system 200 communicates with the server 240 over the network 255. The server controller 245 may determine identity information for a human sound source based on audio content and/or image data provided from the audio system and retrieve a corresponding voice profile of the identified human sound source. The server controller 245 may communicate, via a network, the retrieved voice profile to the audio system. The audio system 200 enhances the portions of the sound originating from the human sound source based on the voice profile, and presents the enhanced audio to the user of the headset.

The I/O interface 540 is a device that allows a user to send action requests and receive responses from the console 545. An action request is a request to perform a particular action. For example, an action request may be an instruction to start or end capture of image or video data, or an instruction to perform a particular action within an application. The I/O interface 540 may include one or more input devices. Example input devices include: a keyboard, a mouse, a game controller, or any other suitable device for receiving action requests and communicating the action requests to the console 545. An action request received by the I/O interface 540 is communicated to the console 545, which performs an action corresponding to the action request. In some embodiments, the I/O interface 540 includes the IMU 515, as further described above, that captures calibration data indicating an estimated position of the I/O interface 540 relative to an initial position of the I/O interface 540. In some embodiments, the I/O interface 540 may provide haptic feedback to the user in accordance with instructions received from the console 545. For example, haptic feedback is provided when an action request is received, or the console 545 communicates instructions to the I/O interface 540 causing the I/O interface 540 to generate haptic feedback when the console 545 performs an action.

The console 545 provides content to the headset 115 for processing in accordance with information received from one or more of: the imaging device 425, the headset 115, and the I/O interface 540. In the example shown in FIG. 5, the console 545 includes an application store 550, a tracking module 555, and an engine 560. Some embodiments of the console 545 have different modules or components than those described in conjunction with FIG. 5. Similarly, the functions further described below may be distributed among components of the console 545 in a different manner than described in conjunction with FIG. 5. In some embodiments, the functionality discussed herein with respect to the console 545 may be implemented in the headset 115, or a remote system.

The application store 550 stores one or more applications for execution by the console 545. An application is a group of instructions, that when executed by a processor, generates content for presentation to the user. Content generated by an application may be in response to inputs received from the user via movement of the headset 115 or the I/O interface 540. Examples of applications include: gaming applications, conferencing applications, video playback applications, or other suitable applications.

The tracking module 555 calibrates the local area of the system 500 using one or more calibration parameters and may adjust one or more calibration parameters to reduce error in determination of the position of the headset 115 or of the I/O interface 540. For example, the tracking module 555 communicates a calibration parameter to the imaging device 425 to adjust the focus of the imaging device 425 to more accurately determine positions of SL elements captured by the imaging device 425. Calibration performed by the tracking module 555 also accounts for information received from the IMU 515 in the headset 115 and/or an IMU 515 included in the I/O interface 540. Additionally, if tracking of the headset 115 is lost (e.g., the imaging device 425 loses line of sight of at least a threshold number of the projected SL elements), the tracking module 555 may re-calibrate some or all of the system 500.

The tracking module 555 tracks movements of the headset 115 or of the I/O interface 540 using information from the imaging device 425, the one or more position sensors 440, the IMU 515 or some combination thereof. For example, the tracking module 555 determines a position of a reference point of the headset 115 in a mapping of a local area based on information from the headset 115. The tracking module 555 may also determine positions of an object or virtual object. Additionally, in some embodiments, the tracking module 555 may use portions of data indicating a position of the headset 115 from the IMU 515 as well as representations of the local area from the imaging device 425 to predict a future location of the headset 115. The tracking module 555 provides the estimated or predicted future position of the headset 115 or the I/O interface 540 to the engine 560.

The engine 560 executes applications and receives position information, acceleration information, velocity information, predicted future positions, or some combination thereof, of the headset 115 from the tracking module 555. Based on the received information, the engine 560 determines content to provide to the headset 115 for presentation to the user. For example, if the received information indicates that the user has looked to the left, the engine 560 generates content for the headset 115 that mirrors the user's movement in a virtual local area or in a local area augmenting the local area with additional content. Additionally, the engine 560 performs an action within an application executing on the console 545 in response to an action request received from the I/O interface 540 and provides feedback to the user that the action was performed. The provided feedback may be visual or audible feedback via the headset 115 or haptic feedback via the I/O interface 540.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An audio system comprising:
an array of acoustic sensors configured to detect sounds within a local area with a specific noise level;
an imaging device configured to capture image data associated with the local area; and
a controller configured to:
determine that a sound source in the local area that generates at least a portion of the detected sounds is a particular person, based at least in part on gestures data and one or more facial features in the captured image data comprising a separation between eye pupils for the particular person,
upon the particular person explicitly allowing an identification at a social network via facial recognition for the local area for a specific duration, identify a social network profile on the social network for the particular person using at least the separation between eye pupils in the captured image data,
retrieve a voice profile associated with the specific voice level from the identified social network profile, enhance at least the portion of the detected sounds from the particular person based on the retrieved voice profile to obtain an enhanced audio, and
present the enhanced audio to a user wearing a headset that includes the audio system.

2. The audio system of claim 1, wherein:
the array of acoustic sensors is further configured to record a first voice signal of a speaker in a first environment having a first level of noise; and
the controller is further configured to:
generate a first voice profile for the speaker based on the recorded first voice signal, and
provide the first voice profile to a server, wherein the server updates a social network profile on the social network for the speaker using the first voice profile.

3. The audio system of claim 2, wherein:
the array of acoustic sensors is further configured to record a second voice signal of the speaker in a second environment having a second level of noise higher than the first level of noise; and
the controller is further configured to:
generate a second voice profile for the speaker based on the recorded second voice signal, and
provide the second voice profile to the server, wherein the server updates the social network profile for the speaker using the second voice profile.

4. The audio system of claim 1, wherein the controller is further configured to:
determine a distorted version of the voice profile by filtering the detected sounds;
compare the distorted version of the voice profile with a plurality of voice profiles; and
determine an identity information for the particular person based in part on the comparison.

5. The audio system of claim 4, wherein the controller is further configured to:
identify the social network profile for the particular person further based on the identity information; and
present at least a portion of the identified social network profile to the user via the headset.

6. The audio system of claim 1, wherein the controller is further configured to:
filter the detected sounds to determine at least the portion of the detected sounds originating from the particular person, responsive to determination that the sound source is the particular person.

7. The audio system of claim 1, wherein the controller is further configured to:
determine that the sound source in the local area is the particular person further based on a gaze direction for an eye of the user; and
responsive to determination that the sound source is the particular person, filter the detected sounds to determine at least the portion of the detected sounds originating from the particular person.

8. The audio system of claim 1, wherein the controller is further configured to:
determine a distorted version of the voice profile by filtering the detected sounds; and
communicate information about the distorted version of the voice profile to a server.

9. The audio system of claim 1, wherein the controller is further configured to:
communicate information about the captured image data to a server.

10. A method comprising:
detecting sounds within a local area with a specific noise level;
capturing image data associated with the local area;
determining that a sound source in the local area that generates at least a portion of the detected sounds is a particular person, based at least in part on gestures data and one or more facial features in the captured image data comprising a separation between eye pupils for the particular person;
upon the particular person explicitly allowing an identification at a social network via facial recognition for the local area for a specific duration, identifying a social network profile on the social network for the particular person using at least the separation between eye pupils in the captured image data;
retrieving a voice profile associated with the specific voice level from the identified social network profile;
enhancing at least the portion of the detected sounds from the particular person based on the retrieved voice profile to obtain an enhanced audio; and
presenting the enhanced audio to a user wearing a headset that includes the audio system.

11. The method of claim 10, further comprising:
recording a first voice signal of a speaker in a first environment having a first level of noise;
generating a first voice profile for the speaker based on the recorded first voice signal;
recording a second voice signal of the speaker in a second environment having a second level of noise higher than the first level of noise;
generating a second voice profile for the speaker based on the recorded second voice signal; and
providing the first voice profile and the second voice profile to a server, wherein the server updates a social network profile on the social network for the speaker using the first voice profile and the second voice profile.

12. The method of claim 10, further comprising:
determining a distorted version of the voice profile by filtering the detected sounds;
comparing the distorted version of the voice profile with a plurality of voice profiles stored at a non-transitory computer readable medium; and
determining an identity information for the particular person based in part on the comparison.

13. The method of claim 10, wherein the captured image data for the particular person further includes one or more facial expressions.

14. The method of claim 10, further comprising:
determining a distorted version of the voice profile by filtering the detected sounds; and
communicating information about the distorted version of the voice profile to a server.

15. The method of claim 10, further comprising:
communicating information about the captured image data to a server.

16. A computer program product comprising a non-transitory computer-readable storage medium having instructions encoded thereon that, when executed by one or more processors, cause the one or more processors to:
detect sounds within a local area with a specific noise level;
initiate capturing of image data associated with the local area;
determine that a sound source in the local area that generates at least a portion of the detected sounds is a particular person, based at least in part on gestures data and one or more facial features in the captured image data comprising a separation between eye pupils for the particular person;

upon the particular person explicitly allowing an identification at a social network via facial recognition for the local area for a specific duration, identify a social network profile on the social network for the particular person using at least the separation between eye pupils in the captured image data;

retrieve a voice profile associated with the specific voice level from the identified social network profile;

enhance at least the portion of the detected sounds from the particular person based on the retrieved voice profile to obtain an enhanced audio; and present the enhanced audio to a user wearing a headset.

17. The computer program product of claim 16, wherein the instructions further cause the one or more processors to:

initiate communicating information about the captured image data to a server.

* * * * *